United States Patent

[11] 3,550,737

| [72] | Inventor | Bryan Philip Kent<br>Ithaca, N.Y. |
|---|---|---|
| [21] | Appl. No. | 785,880 |
| [22] | Filed | Dec. 23, 1968 |
| [45] | Patented | Dec. 29, 1970 |
| [73] | Assignee | Borg-Warner Corporation<br>Chicago, Ill.<br>a corporation of Delaware |

[54] SPRAG ASSEMBLY FOR ONE-WAY CLUTCHES
4 Claims, 3 Drawing Figs.

[52] U.S. Cl. ................................................. 192/45.1
[51] Int. Cl. ............................................... F16d 41/07
[50] Field of Search ........................................ 192/41.3,
45.1; 188/82.8

[56] References Cited
UNITED STATES PATENTS

| 2,570,290 | 10/1951 | Turner | 192/45.1 |
|---|---|---|---|
| 2,598,864 | 6/1952 | Turner | 192/45.1 |
| 2,748,912 | 6/1956 | Banker | 192/45.1 |

FOREIGN PATENTS

| 519,199 | 12/1955 | Canada | 192/45.1 |
|---|---|---|---|

Primary Examiner—Allan D. Herrmann
Attorneys—Donald W. Banner, Lyle S. Motley, C. G. Stallings and William S. McCurry ABSTRACT: An overrunning one-way clutch is disclosed herein providing a structure whereby a drive and driven member are interconnected to provide a drive condition therebetween in one direction of relative rotation thereof and an overrunning condition therebetween in the other direction of relative rotation thereof. A sprag assembly is shown in conjunction with the overrunning clutch to provide the drive and overrunning condition between the drive and driven members. The sprag assembly includes a sprag cage for rotatably positioning sprags, sprags positioned in the cage, and means for urging the sprags into position in the cage and to rotatably urge the sprags into engagement with the drive and the driven members.

PATENTED DEC 29 1970  3,550,737
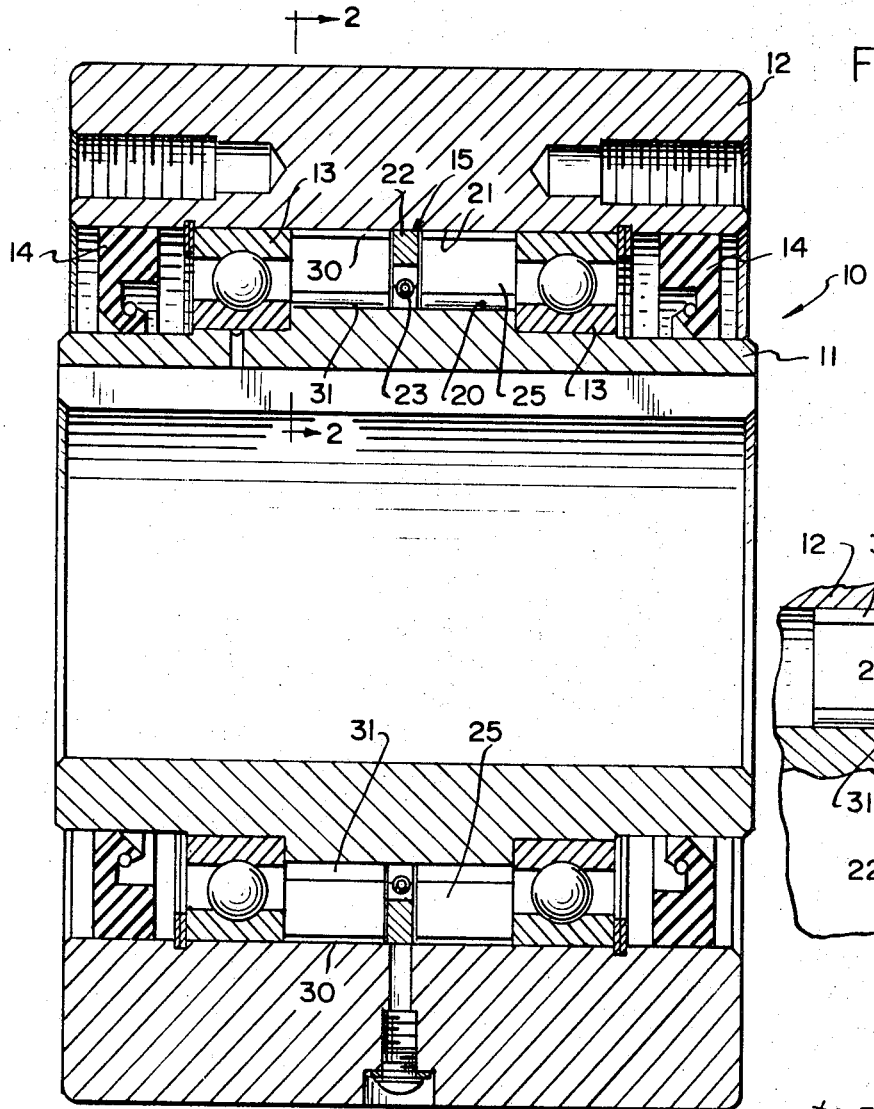
FIG. 1
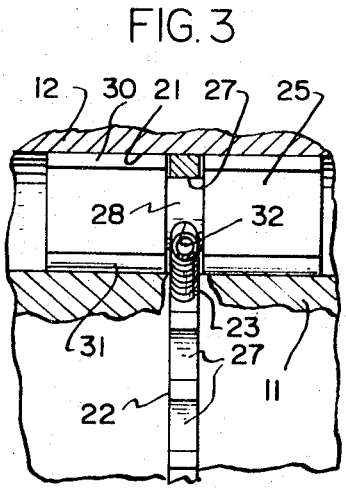
FIG. 3
FIG. 2
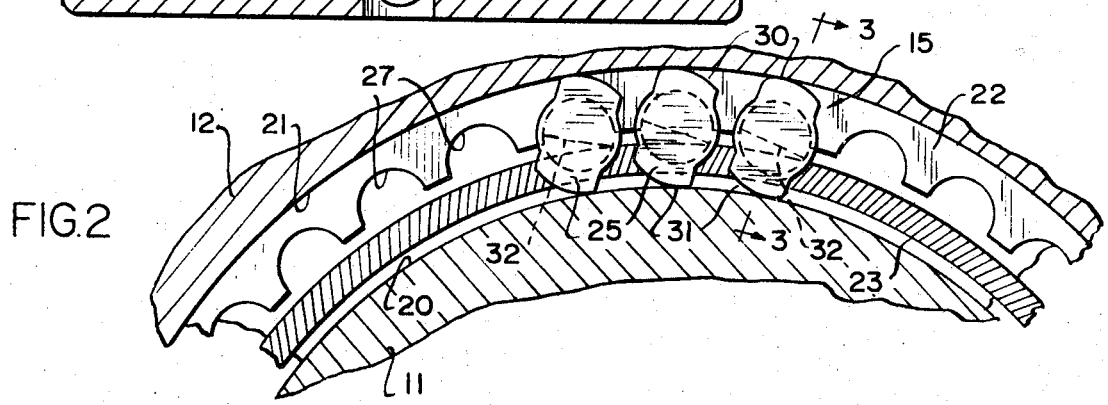
INVENTOR
BRYAN P. KENT
BY Evan D Roberts
ATTORNEY

3,550,737

SPRAG ASSEMBLY FOR ONE-WAY CLUTCHES

SUMMARY OF THE INVENTION

This invention relates to a sprag assembly for one-way overrunning clutches having an inner and an outer race as part of the drive and driven members wherein a sprag cage is provided which has a series of concave substantially semicircular sprag bearing surfaces axially formed therein to complementally receive convex circular portions of sprags to rotatably position the sprags in the cage. The sprags are adapted to engage the races to provide a driving relationship therebetween when the sprags are urged in one rotational direction in the cage bearing surfaces and means is provided for urging the sprags into the cage bearing surfaces and for rotatably urging the sprags into engagement with the races.

This structure provides control of the pivotal movement of the sprags, fixes the pivotal position between the sprags and between the inner and outer races, creates easy assembly without requiring extraordinary precision, and facilitates control of centrifugal features which may be critical within the sprags by providing a sprag cage bearing surface.

Presently known types of sprag assemblies for one-way clutches, among other things, do not provide a structure wherein the sprags can be supported on a single bearing support surface or journal while providing a cage structure which supports the sprags from the radial exterior thereof only to provide a rotational bearing support and yet provide a sufficient looseness to allow the sprags to appropriately react with the inner and the outer race on other than a rigidly fixed axis.

In addition, the known types of sprag assemblies for one-way clutches do not provide cages for supporting sprags which in addition to providing the above-mentioned structures and advantages will provide circumferential positioning of the sprags within the cage to provide spacing therebetween without direct interreaction between the sprags and to provide a circumferential bearing surface for the support of the sprags in conjunction with a radial support surface.

Accordingly, the objects of this invention are to provide a sprag assembly for one-way clutches wherein the sprags may be respectively retained in a single cage bearing support surface, the cage support surface will be generally radially exterior with respect to the sprags, the cage support surface will provide a rotational bearing surface for the sprags and yet allow the sprags to have a slightly variable or loose axis of rotation to permit the proper reaction of the sprag with the inner and outer races, and the sprag cage will provide a circumferential positioning structure for the sprags whereby there is no direct interreaction between the sprags and the sprags are provided with circumferential bearing surfaces in addition to radial bearing surfaces.

A further object of this invention is to provide a sprag assembly for one-way clutches which is relatively simple to assemble and economical to manufacture.

Other advantages and novel aspects of the invention will become apparent upon consideration of the following detailed description in conjunction with the accompanying drawings wherein:

FIG. 1 is a sectional view of a one-way overrunning sprag clutch showing the novel sprag assembly of this invention as utilized in the clutch;

FIG. 2 is a partial sectional view taken along line 2—2 of FIG. 1 showing the details of the sprag assembly; and FIG. 3 is a partial sectional view taken along line 3—3 of FIG. 2 showing the details of the sprag assembly of this invention through the point of contact of the sprag between the inner and outer races.

A one-way cam or overrunning sprag clutch generally represented by the numeral 10 is disclosed herein (FIG. 1) for the purpose of illustrating the invention, and includes generally, among other things, an inner rotating drive member 11, an outer rotating drive member 12, bearings 13 supporting the outer member 12 on the inner member 11, lubricant seals 14, and the sprag assembly 15 (FIGS. 1—3) of this invention, which provides a drive or an overrunning condition between the inner and outer members 11 and 12. The inner member 11 is provided with an inner race surface 20 adjacent the sprag assembly 15 of this invention and the outer member 12 is similarly provided with an outer race surface 21 adjacent the sprag assembly 15 of this invention.

The sprag assembly 15 of this invention includes generally a cage ring 22, an energizing spring 23, and a series of cams or sprags 25. The cage ring 22 is provided with a series of circumferentially spaced concave circular sprag bearing surfaces 27 for receiving a convex sprag trunnion 28 forming a recessed portion of said sprags.

The sprags 25 are each provided with the trunnion 28 thereof rotatably mounted in the bearing surfaces 27 of the cage ring 22 and are provided with outer cam surfaces 30 and inner cam surfaces 31 adapted to drivingly engage the outer race 21 and the inner race 20 when the inner race 20 is rotated clockwise with respect to the outer race 21 (FIG. 2) and to normally drivingly disengage and drag on the outer race in an overrunning condition when the inner race 20 is moved counterclockwise with respect to the outer race 21.

The sprags 25 are provided with a surface 32 through each trunnion 28 thereof. The expanding energizing spring 23 is provided in respective engagement with the transverse surfaces 32 of the sprags 25 to urge the sprags 25 into rotating complemental engagement with the cage bearing surfaces and counterclockwise (FIG. 2) into driving engagement between the inner and outer races 20 and 21.

In summary, it is to be noted, that the sprag assembly 15 for one-way overrunning clutches which is provided by this invention provides a sprag assembly structure whereby the sprags can be retained by a sprag cage which is a single annular ring and the sprags are thus retained by a single structure, namely, the energizing spring 23. The sprags thus retained are positioned in circumferentially spaced bearing surfaces 27 which provide a rotational bearing surface and yet a loose retention against the resilience of the spring 23 to allow appropriate freedom for reaction between the inner and outer races by the sprags 25. The structure of the assembly of this invention also provides circumferential rotational support for the sprags and prevents direct interreaction between the sprags.

It is to be understood that the invention is not to be limited to the specific constructions and arrangements shown and described, as it will be understood to those skilled in the art that certain changes may be made without departing from the principles of the invention.

I claim:

1. A sprag assembly for one-way clutches comprising inner and outer races adapted to rotate about a common axis, a sprag cage between said inner and outer races and having a series of concave substantially semicircular sprag bearing surfaces axially formed therein and opening inwardly toward said inner race, a series of sprags having convex circular portions adjacent the outer side thereof and complemental to said cage concave sprag bearing surfaces for respective bearing engagement therewith, said sprags engaging said races to provide a driving relationship therebetween when said sprags are urged in one rotational direction in said cage bearing surfaces, and means for urging said sprags into the cage bearing surfaces and for rotatably urging said sprags into engagement with said races.

2. A sprag assembly for one-way clutches as defined in claim 1 wherein said urging means comprises a transverse surface adjacent the inner side of said sprags and spring biased radially outwardly and in engagement with at least a portion of said transverse surface of said sprags.

3. A sprag assembly for one-way clutches as defined in claim 1 wherein said sprag cage comprises a single annular ring.

4. A sprag assembly for one-way clutches as defined in claim 3 wherein said urging means comprises a transverse surface adjacent the inner side of said sprags and spring biased radially outwardly and in engagement with at least a portion of said transverse surface of said sprags.